Aug. 15, 1967  E. O. CAIN  3,336,517

SPEED REGULATING CONTROL SYSTEM FOR UNIVERSAL MOTOR

Filed Oct. 1, 1964

INVENTOR

ERNEST O. CAIN

BY

ATTORNEY

United States Patent Office 3,336,517
Patented Aug. 15, 1967

3,336,517
SPEED REGULATING CONTROL SYSTEM
FOR UNIVERSAL MOTOR
Ernest O. Cain, Dallas, Tex., assignor to Hunt Electronics
Company, Dallas, Tex., a corporation of Texas
Filed Oct. 1, 1964, Ser. No. 400,668
6 Claims. (Cl. 318—332)

ABSTRACT OF THE DISCLOSURE

There is disclosed in the specification and drawings a motor control circuit for use with universal type motor powered by alternating currents supply voltage. The motor control circuit includes a switching means which normally exhibits a high impedance state to the flow of current in at least one direction but which is capable of being switched to exhibit a low impedance state in the flow of current in said at least one direction when a control signal is applied thereto. The switching means is adapted to be connected in series with the universal motor to be controlled, a source of alternating current supply voltage and the primary winding of the transformer. There is also provided a full wave rectifier bridge which is connected across the A.C. supply and which produces as its output terminals a full wave rectified signal. A variable resistor and a capacitor are connected across the output of the full wave rectifier bridge. There is also provided a rectifying and filtering means connected to the secondary winding of the transformer whose primary is connected in series with the switching device and the universal motor. The rectifying and filtering means produces an output signal of an amplitude which varies as a function of the effective current flowing through the motor. The signal produced by the rectifying and filtering means is also applied to charge the capacitor connected across the output of the full wave rectifying bridge. There is also disclosed a unijunction transistor which is responsive to the charge on the capacitor and which, when turned on, causes a control signal to be generated and applied to the switching means to permit the flow of current through the motor.

Figure 1:
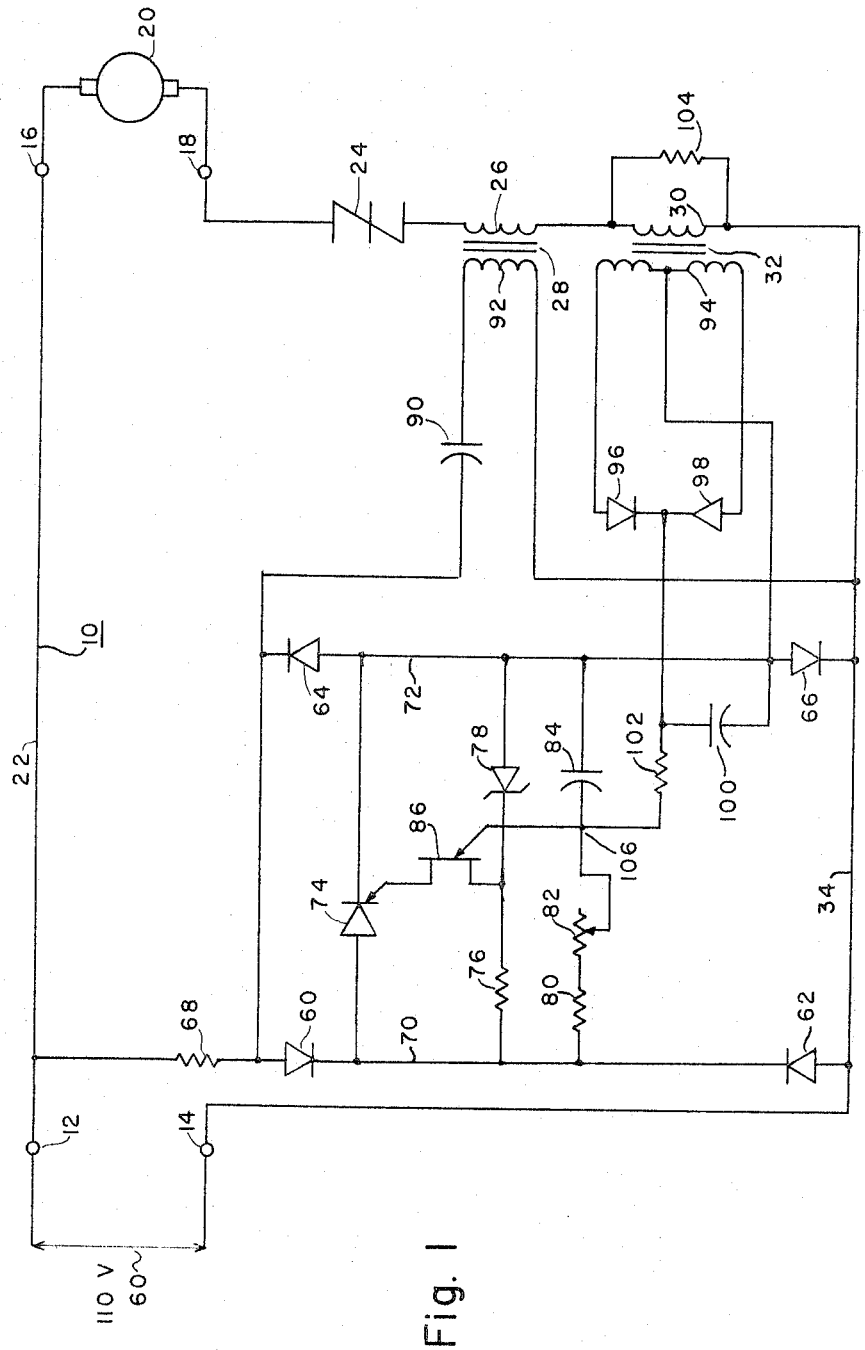

Universal motors are most often utilized in many appliance applications. For example, universal motors are often used in portable tools, sewing machines, various types of food and drink mixers, vacuum cleaners and similar applications wherein it is desirable that the motor be characterized by light weight, compactness and portability.

In such applications it is desirable that the speed of motor be adjustable and several types of control circuits have been suggested for adjusting the speed of universal type motors by varying the effective power applied to the motor. Moreover, in such applications, once the speed has been set to a desired level, it is desirable that it remain constant as the load imposed on the motor varies. Although several types of circuits have been suggested for controlling the speed of the motor by controlling the effective power applied to the motor, the requisite feedback required to maintain the speed constant as the load on the motor varies has provided a source of difficulty. Most such prior art systems utilize the potential developed across the armature winding of the motor for obtaining the necessary feedback. As is well known in the art, the voltage developed across the armature will vary directly as a function of the load imposed upon the motor. However, such feedback systems have not proved entirely acceptable.

The present invention provides an improved motor control circuit for controlling the speed of a universal motor which is characterized by a high degree of simplicity and reliability but yet which is relatively inexpensive. In accordance with the present invention, a switching device having a normally high impedance to current flow in at least one direction but which is capable of being switched to exhibit a low impedance to current flow in the at least one direction when a control signal is applied thereto is connected in series with the windings of the universal motor and a source of alternating current supply voltage. By controlling the phase relationship between the control signal and the applied alternating current supply voltage, the effective power applied to the motor can be controlled. The present invention also provides a current sensitive element for producing a signal having a character which varies as a function of the current flowing through the element. The current sensitive element is connected in circuit with the universal motor for producing a signal which varies as a function of the current through the motor. The signal produced by the current sensitive element is applied to the means which produces and applies the control signal to the switching device. The signal from the current sensitive element controls the control signal generating means to vary the phase relationship between the control signal and the applied alternating current supply voltage as a function of the character of the signal produced by the current sensitive element. In accordance with one specific embodiment of the invention, the switching device utilized is a five-layer device which is symmetrical in its switching action and which is sold by Hunt Electronics Company under the name "Symmetrical Silicon Switch (SSS)." The current sensitive element, in accordance with the preferred embodiment of the invention, is a transformer.

Figure 2:
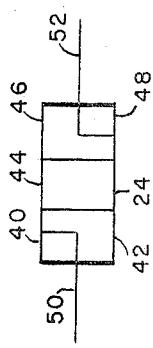

The novel features of the invention are set forth with particularity in the appended claims. Many objects and advantages of the invention will become apparent to those skilled in the art as the following detailed description of the same unfolds when taken in conjunction with the appended drawing wherein:

FIGURE 1 is a schematic diagram illustrating a preferred embodiment of the motor control circuit provided by the present invention; and FIGURE 2 is a view illustrating the structure of a preferred type of semiconductor device utilized in practicing the present invention.

Turning now to the drawing, the motor control provided by the present invention is noted generally by the reference numeral 10 and includes four terminals 12, 14, 16 and 18. Terminals 12 and 14 are adapted to be connected to a source of alternating current supply voltage, suitably 110 volts, 60 cycles. Terminals 16 and 18 are adapted to be connected to the terminals of a universal type motor, indicated by the reference character 20.

As shown, terminals 12 and terminal 16 are connected by conductor 22, connecting one side of the motor 20 to the source of alternating current supply voltage. Terminal 18 is connected through diode device 24, secondary winding 26 of transformer 28 and the primary winding 30 of transformer 32 and conductor 34 to terminal 14. The other side of the motor 20 is thereby connected to the other side of the alternating current supply voltage source through the diode device 24. By controlling the conduction time of the device 24 during each half cycle of the alternating current supply voltage, it is possible to control the effective power applied to the motor 20, thereby controlling its speed The diode device 24 utilized in practicing the invention is preferably of the type shown in FIGURE 2 of the drawing. As shown, it comprises a body of semiconductor material having five regions 40, 42, 44, 46 and 48 formed therein, with contiguous regions being of opposite type conductivity. The opposite conductivity regions 40 and 42 are each connected to a common electrode 50 and the regions 46 and 48 each are connected to a common electrode 52.

The device 24 is symmetrical in its switching action. That is, the device 24 normally exhibits a high impedance to the flow of current in either direction. However, if a voltage of amplitude greater than the breakover voltage of the device is supplied across the electrodes 50 and 52, the device will switch to a low impedance state permitting current to flow in a direction dependent upon the polarity of the applied voltage. Once the device switches to its low impedance state, it will remain in the low impedance state until the current flowing through the device falls below the critical level, called the holding current $I_H$. It will be appreciated, however, that the invention is not limited to the particular device shown and other types of devices which can be switched from a normally high impedance state to a low impedance state can be utilized in practicing the invention. For example, two oppositely poled Shockley diodes of the type disclosed in United States Patent No. 2,855,524 can be utilized in practicing the invention.

Turning once again to FIGURE 1 of the drawings, the manner in which the switching of the device 24 is controlled to control the speed of the motor 20 will be explained. As shown, four rectifiers 60, 62, 64 and 66 are connected to form a full wave bridge circuit. The juncture between rectifiers 60 and 64 is connected through a resistor 68 to conductor 22. Rectifiers 62 and 66 are each connected to conductor 34. When the terminals 12 and 14 are connected to a source of alternating current supply voltage, the full wave rectified signal will appear across the lines 70 and 72, with the line 70 being more positive than line 72.

The anode of a silicon controlled rectifier (SCR) 74 is connected to line 70 with a cathode of SCR 74 connected to line 72. At such time as a signal of the proper polarity is applied to the gate electrode of the SCR 74, the SCR will switch from a normally high impedance state to a low impedance state permitting current to flow between the lines 70 and 72. When the device 74 switches to its low impedance state, the resistor 68 acts to drop the voltage appearing across the rectifier bridge to a level sufficient only to maintain the device 74 in the low impedance state.

Switching of the device 74 is controlled by a unijunction transistor 86, the gate electrode of the device 74 being connected to one of the bases of unijunction transistor 86. The other base of the unijunction transistor 86 is connected to the juncture between resistor 76 and a zener diode 78, the resistor 76 and zener diode 78 being connected in series between the lines 70 and 72. The zener diode 78 sets the bias voltage applied to the other base electrode, with the resistor 76 functioning to limit the flow of current through the zener diode 78. As is well known in the art, the unijunction transistor 86 also normally exhibits a high impedance state but switches to the low impedance state when the ratio between the potential applied to its gate electrode and the voltage applied to its other base electrode attains a critical level.

The gate electrode of unijunction transistor 86 is connected to the juncture beween the variable resistor 82 and the capacitor 84. Resistor 80, variable resistor 82 and capacitor 84 are connected in series between the lines 70 and 72. The resistors 80 and 82, capacitor 84 and unijunction transistor 86 function as a relaxation oscillator whose period is determined by the time required with a voltage impressed between lines 70 and 72 to charge the capacitor 84 to a potential sufficient to cause the unijunction transistor 86 to switch to its low impedance state. When the unijunction transistor 86 switches to the low impedance state, the capacitor 84 will discharge through the gate electrode and one base of the unijunction transformer, biasing the silicon control rectifier 74 on.

The juncture between rectifiers 60 and 64 is also connected through capacitor 90 and the primary winding 92 of transformer 28 to line 34. The capacitor 90 is therefore charged each half cycle of alternating current supply voltage through a charge path comprising line 22, resistor 68, capacitor 90, primary winding 92 and line 34. When the silicon control rectifier switches to the low impedance state, a discharge path is provided for the capacitor 90 through the rectifier bridge and the SCR. Each time the capacitor 90 discharges, a relatively high current pulse is applied to the primary winding 92 of transformer 28 causing a high voltage pulse to be induced in the secondary winding 26. The pulse induced in the secondary winding 26 is applied across the device 24, causing it to switch to the low impedance state. The direction in which the capacitor 90 is charged will govern the polarity of the voltage pulse induced in the secondary winding 26 and will, therefore, control the direction in which the device 24 is switched to permit the flow of current.

From the above, it will be apparent that the setting of the variable resistor 82 will control the phase relationship between the voltage induced in the secondary winding 26 and each half cycle of applied alternating current supply voltage. By varying the resistor 82, it is therefore possible to control the effective power applied to the motor 20 and thereby control the speed of the motor under constant load conditions.

However, as the load on the motor varies, the amount of power applied to the motor for any particular setting of the resistor 82 will remain constant and the speed of the motor will vary as an inverse function of the load on the motor. If the motor is to operate at a substantially constant speed over a relatively large range of loads, it is necessary that the effective power applied to the motor also be made to vary as a function of the load applied to the motor.

The necessary control is supplied by a circuit comprising the transformer 32 whose secondary winding 94 is of the center tap type and connected across two oppositely poled rectifiers 96 and 98. The center tap of the secondary winding 94 is connected to line 72 and to one side of a capacitor 100. The juncture between the oppositely poled rectifiers 96 and 98 is connected to the other side of the capacitor 100 and through resistor 102 to the juncture between the resistor 82 and the capacitor 84.

A resistor 104 is connected in shunt with the primary winding 30 of the transformer 32. A potential will be developed across the resistor 104 which is a function of the current flowing through the motor 20, which potential will be applied across the primary winding 30 of the transformer 32. A rectified and filtered full wave voltage will, therefore, appear at a junction point 106, whose amplitude will be a function of the current flowing through the motor 20. The capacitor 84, which controls the switching of the unijunction device 86 which, in turn, controls switching of the SCR 74, will, therefore, be charged as a function of the amplitude of the voltage developed across the secondary winding 94 of transformer 32 as well as the setting of the variable resistor 82.

Thus, in operation of the motor control provided by the present invention, the variable resistor 82 is adjusted to provide the desired speed under no load conditions. As the motor is subsequently loaded, the current flowing through the motor 20 will increase with the amount of increase in current being a function of the load impressed on the motor. The increase in current flowing through the motor will increase the potential applied to the primary winding 30 of transformer 32, increasing the potential applied to a junction point 106 and causing the capacitor 84 to be charged to a potential sufficient to cause the unijunction transistor 86 to switch to its low impedance state at an earlier point in the half cycle of applied alternating current supply voltage. The earlier switching of the unijunction transistor 86 will cause the silicon control rectifier 74 to also switch to its low impedance state at an earlier point in the particular half cycle of alternating current supply voltage, causing the effective power applied to the motor 20 to increase and tend to restore the speed of the motor to that initially set.

When the load is removed from the motor, the current flowing through its windings will decrease. The voltage across the secondary winding 94 of transformer 32 will also decrease, causing the potential at point 106 to decrease toward the potential existing under no load conditions. The phase angle between the beginning of a half cycle of applied supply voltage and the point at which a firing signal is generated in the control circuitry will increase. As the phase angle increases, the effective power applied to the motor will decrease, and the speed of the motor will tend to remain constant as the load is decreased.

It will be noted that the resistor 104 is not in all instances an essential part of the circuit, as the transformer can be designed in such a manner that the voltage appearing across its output winding 94 will vary as a function of the current flowing through the primary winding 30. Also, the particular control circuitry shown can use a different type of switching device. The essential feature of the invention is that firing signal is developed and applied to a semiconductor power device with the phase relationship between the firing signal and the applied alternating current supply voltage being settable under one load condition, and thereafter variable as a function of the change in current flowing through the motor.

In a practical embodiment of this invention, the following specific elements were employed:

| | |
|---|---|
| Diode 24 | Hunt Electronics Company SSS. |
| Transformer 28 | Turns ratio 1 to 40. |
| Transformer 30 | Turns ratio 1 to 10. |
| Doides 60, 62, 64 and 66 | Texas Instruments 692. |
| Resistor 68 | 12,000 ohms. |
| SCR 74 | Texas Instruments 2N 1597. |
| Resistor 76 | 8,200 ohms. |
| Diode 78 | Texas Instruments IN 759. |
| Resistor 80 | 10,000 ohms. |
| Resistor 82 | 0–500,000 OHMS. |
| Capacitor 84 | 1/10 microfarad. |
| Capacitor 90 | 1/10 microfarad. |
| Diodes 96 and 98 | Texas Instruments 692. |
| Capacitor 100 | .47 microfarad. |
| Resistor 102 | 1 megohm. |
| Resistor 104 | 1 ohm. |

A circuit using the above components was successfully used in controlling the small universal motors in several applications such as hand drills and food blenders. Using such a motor control, it was found possible to vary the speed of the motor over an extremely wide range and it was further found that the speed of the motor, once set, remained substantialy constant as the load was varied.

It will be noted, however, that the amount of current flowing will vary also as a function of the size of the motor. It will therefore be necessary to either charge the turns ratio of the transformer 32 or vary the resistance of the resistor 102 to provide the proper voltage at point 106 to obtain the requisite feedback. It will also be noted that for optimum results, the time constant of the circuit comprising resistor 102 and capacitor 100 should be greater than the period of one half cycle in order that the preceding half cycle will effectively control the conduction time of the device 24 during the next half cycle. The relatively long time constant will also prevent the charge on the capacitor 100 being influenced by the potential appearing at point 106.

Although the invention has only been described with regard to a single preferred embodiment thereof, many changes and modifications within the scope of the appended claims will become obvious to those skilled in the art in view of the foregoing description.

What I claim is:

1. A circuit for controlling the speed of a universal motor comprising:
   (a) a semiconductor diode device having two power terminals, said diode device normally exhibiting a high impedance to the flow of current between said two power terminals but being switched to exhibit a low impedance state between said terminals when a voltage of predetermined character is applied across said device;
   (b) a first transformer having an input and an output;
   (c) a second transformer having an input and an output;
   (d) means connecting said diode device, the output winding of said first transformer and the input winding of said second transformer in series with said universal motor and a source of alternating current supply voltage;
   (e) a rectifier and filtering means connected to the output of said second transformer for producing a signal whose amplitude varies as a function of the current flowing through said motor;
   (f) a first capacitor connected in series with the input winding of said first transformer;
   (g) means providing a charge path for said first capacitor from said source of said alternating current supply voltage;
   (h) means including a switching element having a normally high impedance state but capable of being excited to a low impedance state for providing a discharge path for said first capacitor through the input winding of said first transformer when said switching means is in the low impedance state, said transformer being effective to apply to said first device a signal of a character to cause said first diode device to switch to the low impedance state responsive to discharge of said capacitor through the input of said first transformer; and
   (i) means effective responsive to the amplitude of the signal produced by said rectifying and filtering means to excite said switching means to the low impedance state whereby the diode device is caused to conduct for the necessary portion of a half cycle to apply sufficient power to said motor to maintain the speed of said motor substantially constant as the load on said motor varies.

2. A circuit as defined in claim 1 wherein said last named means comprises:
   (a) a full wave rectifier bridge connected in parallel with said first capacitor and the input of said first transformer;
   (b) a resistor and a second capacitor connected in series across the output of said rectifier bridge;
   (c) means for applying the signal produced by said rectifying and filtering means to the juncture between said resistor and said second capacitor; and
   (d) means effective responsive to the charge on said capacitor for exciting said switching element to the low impedance state.

3. A circuit as defined in claim 2 wherein said last named means comprises a unijunction transistor having a gate electrode and two base electrodes, means connecting the gate electrode to said juncture, means for applying a biasing voltage to one base electrode and means connecting the other base electrode to apply a signal to said switching element to switch same to the low impedance state responsive to the charge on said second capacitor attaining a level sufficient to turn said unijunction transistor on.

4. A circuit for controlling the speed of a universal motor comprising:
   (a) first and second terminals adapted to be connected to a source of alternating current supply voltage;

(b) third and fourth terminals adapted to be connected to the terminals of a universal motor to be controlled;
(c) means connecting said first terminal and said third terminal;
(d) a first resistor;
(e) a full wave bridge comprising four diode rectifiers having two input terminals and two output terminals;
(f) means connecting said first resistor and the input terminal of said full wave bridge in series between said first and second terminals;
(g) a symmetrical semiconductor diode device which normally exhibits a high impedance to the flow of current in either direction but which is capable of being excited to a low impedance state wherein current can flow in a desired direction responsive to a voltage having an amplitude equal to the breakover voltage of said diode device being impressed across the terminals of said device;
(h) a first transformer having an input and an output;
(i) a second transformer having an input and an output;
(j) means connecting said symmetrical semiconductor diode device, the output of said first transformer and the input of said second transformer in series between said second and said fourth terminals;
(k) a capacitor;
(l) means connecting said capacitor and the input of said first transformer in series across the two input terminals of said full wave bridge;
(m) a silicon controlled rectifier having a gate electrode and two power electrodes;
(n) means connecting the power electrodes of said silicon controlled rectifier between the two input terminals of said full wave bridge;
(o) said silicon controlled rectifier being effective to provide a discharge path for said capacitor through the input terminals of said first transformer when switched from its normally high impedance state to its low impedance state;
(p) a second resistor and a zener diode connected in series between the two output terminals of said full wave bridge;
(q) a unijunction transistor having one base connected to the gate electrode of said SCR and having its other base connected to the juncture between said second resistor and said zener diode;
(r) a third resistor and capacitor connected in series between the two output terminals of said full wave bridge;
(s) means connecting the gate electrode of said unijunction transistor to the juncture between said third resistor and said second capacitor;
(t) two oppositely poled rectifiers connected in series across the output of said second transformer;
(u) means connecting the juncture between said oppositely poled diodes to the juncture between said third resistor and said second capacitor, said last named means including a fourth resistor;
(v) said output of said second transformer having a center tap connected to the juncture between said oppositely poled diodes by a third capacitor; and
(w) a fifth resistor connected in parallel with the input winding of said second transformer.

5. The motor control circuit for controlling the speed of a universal motor comprising:
(a) switching means having two power terminals, said switching means formerly exhibiting a high impedance state to the flow of current in at one direction but capable of being switched to exhibit a low impedance state to the current flow in said at least one direction when a control signal is applied thereto;
(b) a transformer having a primary winding and a secondary winding;
(c) means for connecting said switching means by said two power terminals in series with said primary winding, a universal motor and a source of alternating current supply voltage;
(d) a rectifier and filtering means connected to the output of said secondary winding for producing a signal whose amplitude varies as a function of the effective current flowing through said motor;
(e) a full wave rectifier bridge connected in parallel to the series circuit comprising said universal motor, said primary winding and said switching means;
(f) a resistor means and a capacitor connected in series across an output of said rectifier bridge;
(g) means for applying the signal produced by said rectifying and filtering means to the juncture between said resistor means and said capacitor whereby the charge on the capacitor is a function of the voltage appearing across the output of said rectifier bridge and the signal produced by said rectifying and filtering means; and
(h) means effective responsive to the charge on said capacitor for exciting said switching means to the low impedance state.

6. A circuit is defined in claim 5 wherein said last named means comprises an unijunction transistor having a gate electrode and two base electrodes, means connecting the gate electrode to said juncture, means for applying a biasing voltage to one base electrode, and means connecting the other base electrode to apply a control signal to said switching means to switch same to the low impedance state responsive to the charge on said capacitor attaining a level sufficient to turn on said unijunction transistor.

References Cited

UNITED STATES PATENTS

| | | | |
|---|---|---|---|
| 3,095,534 | 6/1963 | Cockrell | 318—345 X |
| 3,177,417 | 4/1965 | Wright | 318—331 |
| 3,264,544 | 10/1966 | Bowers | 318—345 |

ORIS L. RADER, *Primary Examiner.*

J. J. BAKER, *Assistant Examiner.*